(12) United States Patent
Schreck et al.

(10) Patent No.: US 6,721,121 B1
(45) Date of Patent: Apr. 13, 2004

(54) IN-SITU DETERMINATION OF LANDING ZONE TRANSITION FOR IMPROVED DISK DRIVE RELIABILITY

(75) Inventors: Erhard Schreck, San Jose, CA (US); Doug Krajnovich, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 598 days.

(21) Appl. No.: 09/615,364

(22) Filed: Jul. 13, 2000

(51) Int. Cl.$^7$ ............................................. G11B 5/596
(52) U.S. Cl. ................................. 360/77.02; 360/72.1
(58) Field of Search ...................... 360/72.1, 75, 77.04, 360/77.06, 77.02, 77.08, 77.11

(56) References Cited

U.S. PATENT DOCUMENTS

| | | | | |
|---|---|---|---|---|
| 4,807,062 A | * | 2/1989 | Onodera ....................... | 360/75 |
| 5,559,648 A | * | 9/1996 | Hunter et al. ................. | 360/75 |
| 5,612,833 A | * | 3/1997 | Yarmchuk et al. ............ | 360/75 |
| 5,691,857 A | * | 11/1997 | Fitzpatrick et al. ....... | 360/77.06 |
| 6,061,198 A | * | 5/2000 | Shrinkel ....................... | 360/75 |
| 6,061,200 A | * | 5/2000 | Shepherd et al. ......... | 360/77.04 |
| 6,097,559 A | * | 8/2000 | Ottesen et al. .............. | 360/31 |
| 6,239,935 B1 | * | 5/2001 | Shrinkle ...................... | 360/75 |
| 6,239,937 B1 | * | 5/2001 | Troemel ...................... | 360/75 |
| 6,567,230 B1 | * | 5/2003 | Kagami et al. ............... | 360/75 |
| 6,570,731 B2 | * | 5/2003 | Burke et al. .................. | 360/75 |
| 6,614,614 B1 | * | 9/2003 | Murayama et al. ...... | 360/77.02 |

OTHER PUBLICATIONS

Schreck et al., "Magnetic Readback Microscopy Applied to Laser–Texture Characterization in Standard Desktop Disk Drives", Oct. 17, 1997, 3 pages.

* cited by examiner

*Primary Examiner*—David Hudspeth
*Assistant Examiner*—Fred F. Tzeng
(74) *Attorney, Agent, or Firm*—Tejpal S. Hansra

(57) ABSTRACT

A data storage disk is formatted using a measured edge location of a textured landing zone as a reference for writing servo information to the surface of the disk. The edge of the textured landing zone is determined by moving a transducer across the surface of the disk in a radial direction while monitoring a signal generated by the transducer. When a predetermined indication is detected within the signal, the corresponding location of the transducer is recorded. This transducer location is then used to calculate a desired location of at least one data track of the data storage disk. Preferably, this procedure is performed within a servo track writer. In one embodiment, a worst-case edge location is determined for all of the disk surfaces within a disk stack. This worst-case edge location is then used as a reference for writing servo information on all disk surfaces within the stack.

45 Claims, 4 Drawing Sheets

IN-SITU DETERMINATION OF LANDING ZONE TRANSITION FOR IMPROVED DISK DRIVE RELIABILITY

FIELD OF THE INVENTION

The invention relates generally to data storage systems and, more particularly, to disk based data storage systems.

BACKGROUND OF THE INVENTION

A disk drive is a data storage device that stores data in concentric tracks on a disk shaped medium. Data is written to or read from the medium by spinning the medium about a central axis while positioning a transducer near a target track of the medium. During a read operation, data is transferred from the target track to an attached host through the transducer. During a write operation, data is transferred in the opposite direction. When a request to perform a read or write operation is received, the disk drive must move the transducer from a current position to a position that is substantially centered on the target track before a data transfer can take place. A servo control loop is typically provided for controlling the motion of the transducer. The servo control loop uses servo information stored on the surface of the disk, and read by the transducer, as feedback information for controlling the motion of the transducer.

The servo information that is located on the surface of the data storage disk is typically written to the disk before the disk is installed into the disk drive. The servo information can include, among other things, servo burst information (e.g., ABCD bursts) for defining a centerline of each track on the disk and track address information (e.g., Gray code data) for identifying each track on the disk. A servo track writer (STW) is normally used for writing the servo information to the disk. A STW is a highly precise machine that is capable of writing servo information on the disk surface with a high degree of positional accuracy.

Modern hard disk drives typically utilize a plurality of data storage disks arranged in a vertical stack configuration having a common axis of rotation. For such a disk drive, servo information is typically written by the STW to all of the disk surfaces in the stack simultaneously so that a number of vertically aligned "cylinders" results, each cylinder including one track on each disk surface. After the servo information has been written to the disk surfaces by the STW, the disk stack is mounted within the disk drive housing along with the other components of the disk drive.

The transducer associated with a particular disk surface in a disk drive is mounted to one end of an actuator arm which supports the transducer near the disk surface. The other end of the actuator arm is coupled to a voice coil motor that is operative for imparting motion to the actuator arm, in response to a control signal, to move the transducer in a radial direction with respect to the associated disk surface. Mechanical "crash stops" are implemented at the inner and outer extremes of transducer movement to act as a buffer should the transducer move beyond a desired movement range. Traditionally, the positional tolerance of the crash stops has been used as a reference to determine where to write the servo information on the surface of the disks in a disk drive. However, the positional tolerance of these crash stops is often large and can be unpredictable. Consequently, the position of the outermost track can sometimes be farther out than it should be, thus increasing the likelihood that the transducer will enter the dubbed off area near the outer diameter (OD) of the disk. This situation can lead to reduced reliability in the disk drive.

Therefore, there is a need for a method and apparatus for writing servo information on a data storage disk that is capable of reducing the likelihood that a track will be written too close to the outer diameter (OD) of the disk. There is also a need for a method and apparatus for writing servo information on a data storage disk that is capable of enhancing the reliability of the disk drive.

SUMMARY OF THE INVENTION

The present invention relates to a method and apparatus for writing servo information to a data storage disk that is capable of increasing disk drive reliability. The method and apparatus uses information relating to the location of the outermost edge of a textured landing zone on the disk as a reference for writing servo information to the disk. Preferably, the location of the outermost edge of the textured landing zone is determined on a disk drive by a disk drive basis so that the location of the tracks within a disk drive will be tailored to the individual drive. In a disk drive using multiple disk surfaces, a worst-case edge position is preferably determined for all of the disk surfaces within the drive. This worst-case position is then used as a reference for writing servo information to all of the disk surfaces. In one approach, the innermost track on a disk surface is placed as near as possible to the outer edge of the textured landing zone (or the worst case edge in a stack arrangement) taking into consideration the associated head geometry. Thus, for a given number of tracks, the position of the outermost track on the formatted disk surface will be as far from the outer diameter (OD) of the disk as possible.

In a preferred embodiment of the invention, the location of the outer edge of the textured landing zone is determined by the servo track writer. A number of different techniques for determining the edge location are provided. Each of these techniques involves moving a transducer in a radial direction with respect to the corresponding disk surface and monitoring a signal generated by the transducer. In one approach, a transducer that is sensitive to the changing gap between the transducer and the disk surface (e.g., a magneto resistive head) is used to detect the edge of the texture landing zone. In another approach, information is written to the surface of the disk for use in detecting the edge of the landing zone. In yet another approach, a transducer that is sensitive to mechanical vibrations (e.g., a piezo-electric element) is used to detect physical contact between the transducer and the textured landing zone. When the edge of the landing zone is detected using any of these techniques, the STW records the present position of the transducer. This position is then used as an indication of the location of the outer edge of the landing zone. The servo information is then written to the disk surface using the edge location as a reference.

DETAILED DESCRIPTION OF A PREFERRED EMBODIMENT

Figure 1:
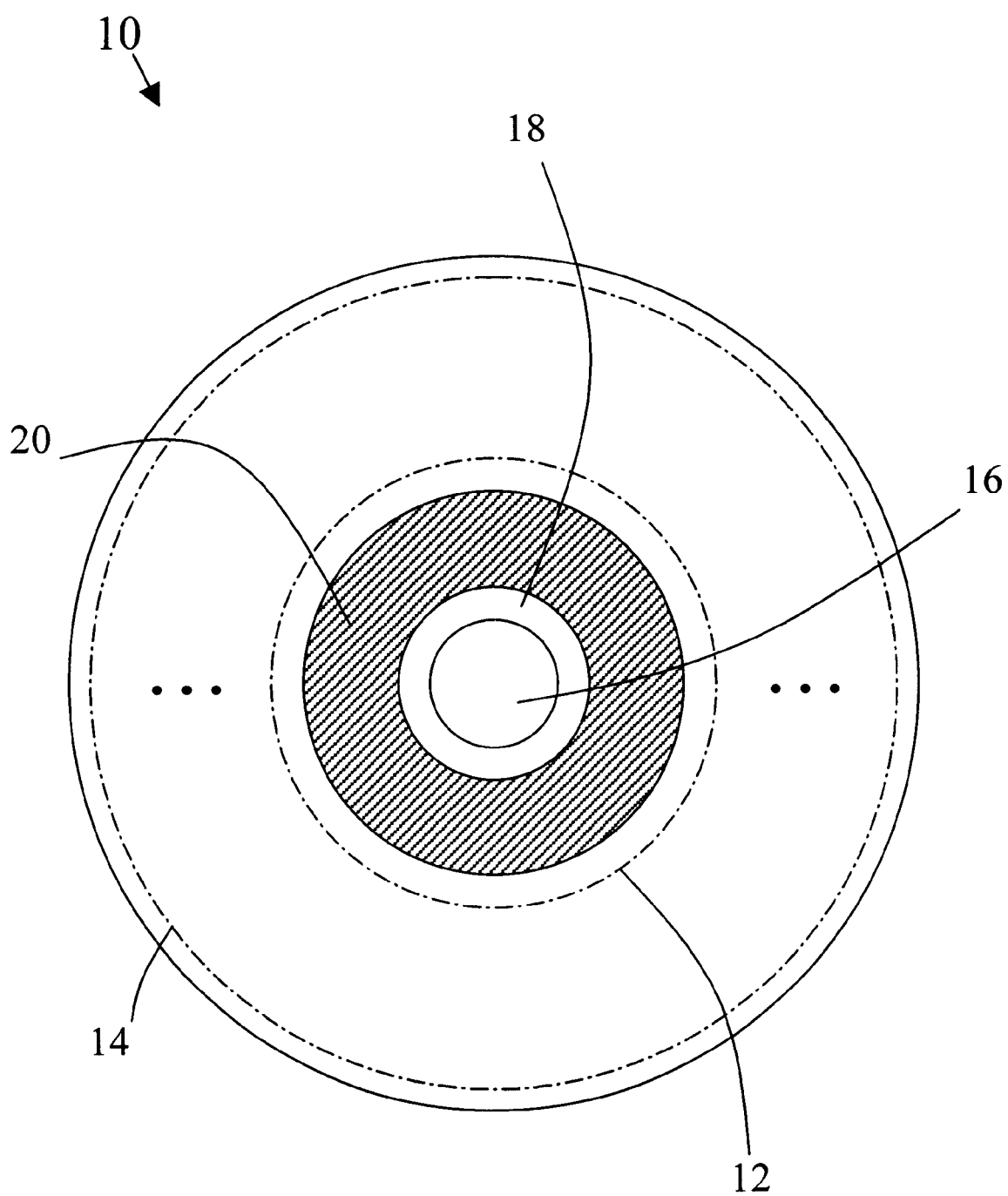
FIG. 1 is a top view of a data storage disk that can be formatted in accordance with the principles of the present invention.

FIG. 1 is a top view illustrating a data storage disk 10 that can be formatted in accordance with the principles of the present invention. As illustrated, the disk 10 is a circular shaped medium having a plurality of substantially concentric data storage tracks, including an innermost track 12 and an outermost track 14, located on an upper surface thereof. Another plurality of tracks can also be located on the lower surface of the disk 10. The disk 10 includes an opening 16 that allows the disk 10 to be mounted to a central hub within the disk drive. A disk clamp 18 is used to hold the disk 10 in a fixed position with respect to the central hub. Modern disk drives normally include multiple disks coupled to a single hub in a stack arrangement.

During normal disk drive operation, the disk 10 is spun about a central axis at a predetermined rotational velocity. Data is written to or read from a desired track of the disk 10 using a transducer that is substantially centered on the desired track during the data transfer. While the disk 10 is spinning at full speed, the transducer flies above the surface of the disk 10 on a layer of air generated by the motion of the disk 10. Thus, there is generally no contact between the transducer and the surface of the disk 10 during data transfer operations. The transducer is generally mounted within a slider structure that has the appropriate aerodynamic qualities for providing the necessary lift to the transducer in response to the disk-generated air currents.

Between the opening 16 and the innermost track 12 of the disk 10 is a textured landing zone 20 that is used as a resting place for the transducer during periods of disk drive inactivity. After the disk drive has been inactive for a period of time, the transducer/slider assembly is moved to the landing zone 20 before the disk 10 is spun down. Once the rotational velocity of the disk 10 has sufficiently decreased, the transducer/slider assembly contacts the upper surface of the textured landing zone 20. Eventually, the disk 10 comes to rest with the transducer/slider assembly resting on the upper surface of the landing zone 20. The landing zone 20 is textured to reduce the friction between the transducer and the landing zone 20 during spin down operations and to reduce/prevent the occurrence of stiction problems during disk spin up operations. Many different techniques are available for texturing the landing zone 20 including methods that utilize mechanical abrasion and methods that use laser based texturing. The upper surface of the textured landing zone 20 is generally higher than the surface of the data storage region of the disk 10.

Within the disk drive, mechanical crash stops are generally provided at the inner and the outer diameters of the disk 10 to prevent the transducer from traveling past a corresponding edge of the disk 10. The crash stops are usually located within a tolerance range that depends upon the specific mechanical design. In the past, tracks were typically written to the surface of a data storage disk in a location that was based on crash stop tolerance values. That is, the worst-case crash stop position for a particular design was used as a reference for locating the tracks on the surface of the disks for an entire production run. In a typical approach, the inner extent of the OD crash stop tolerance range was used as a reference for writing the outermost track of the disk. Thus, the outermost track was written in the same radial position for all of the drives in the production run.

In conceiving of the present invention, it was determined that increased reliability could be achieved by referencing the location of the data tracks to the outer edge of the textured landing zone 20 rather than to the crash stop tolerance. In this manner, the location of the data tracks is tailored to the individual disk drive rather than being constant over the entire production lot. By referencing track location to the edge of the landing zone 20, the data tracks can be located as far inward as possible given the head geometry of the disk drive. This can significantly reduce the likelihood that the transducer will enter the dubbed off area near the outer diameter (OD) of the disk and thus increases the reliability of the drive. If the landing zone is located near the outer diameter of the disk surface, the data track locations are referenced to the inner edge of the textured landing zone in accordance with the present invention.

Figure 2:
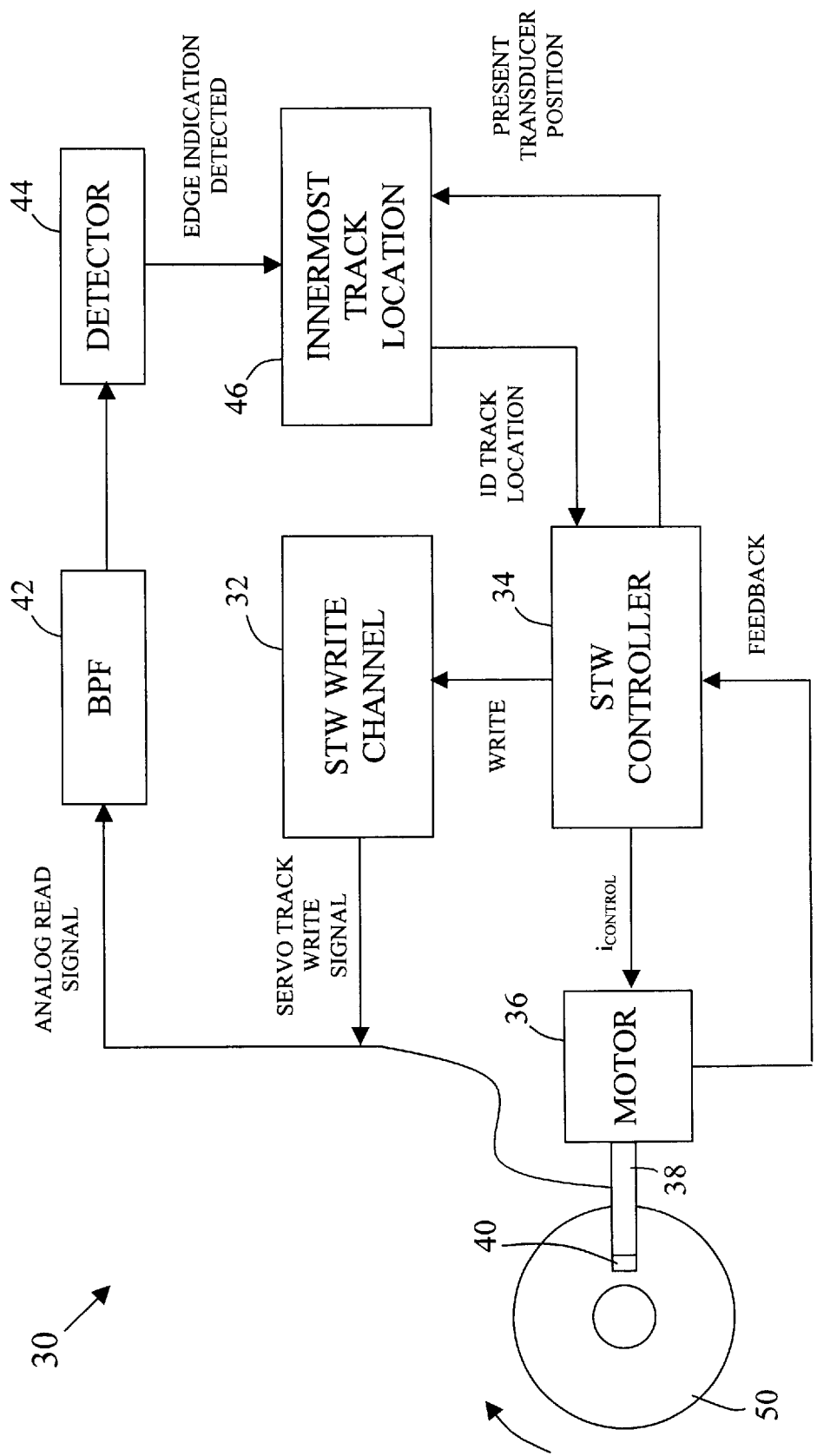
FIG. 2 is a block diagram illustrating a servo track writer unit in accordance with one embodiment of the present invention.

FIG. 2 is a block diagram illustrating a servo track writer (STW) unit 30 in accordance with one embodiment of the present invention. It should be appreciated that the blocks illustrated in FIG. 2 are functional in nature and do not necessarily represent discrete hardware elements. For example, in one approach, two or more of the functional blocks are implemented in software within a common digital processor. As illustrated in FIG. 2, the STW unit 30 includes: a STW write channel 32, a STW controller 34, a motor unit 36, an actuator arm 38, a transducer unit 40, a band pass filter (BPF) 42, a detector 44, and an innermost track location determination unit (ITLDU) 46. To format a disk 50 using the STW unit 30, the disk 50 is mounted to a spin unit (not shown) in a position adjacent to the motor 36 so that the transducer unit 40 is proximate to the surface of the disk 50. The disk 50 is rotated about a central axis at a predetermined rotational velocity while servo information is written to the surface of the disk 50 using the transducer unit 40.

The motor unit 36 is operative for changing the radial position of the transducer unit 40 with respect to the disk 50 in response to a control signal $i_{control}$ from the STW controller 34. The STW controller 34 controls the servo track writing process by moving the transducer unit 40 to predetermined radial locations on the surface of the disk 50 while, at the same time, instructing the STW write channel 32 to generate an appropriate write signal for delivery to the transducer unit 40. STWs are generally capable of achieving a high degree of positional accuracy.

In accordance with the principles of the present invention, the STW controller 34 first determines the desired location of the innermost track before servo information is written to the disk 50. In a preferred approach, the STW controller 34 first positions the transducer unit 40 at a predetermined radial location on the disk 50 and then moves the transducer unit 40 in a radial direction toward the edge of the landing zone while monitoring a signal generated by the transducer unit 40. Preferably, the predetermined radial location is outside the outer edge of the textured landing zone and the transducer unit 40 is moved inward toward the center of the disk 50. The transducer unit 40 can include a single transducer for performing both servo track writing and landing zone edge detection or multiple transducers can be provided for performing these different functions.

Typically, the textured landing zone of the disk 50 will have a texturing pattern that generates a predictable repeat frequency component within a generated signal. For example, one popular texturing method that is used in disk landing zones includes laser bumps on the surface of the disk. The laser bumps are typically positioned with a fixed linear spacing which leads to a well-defined repeat frequency for a constant disk velocity. The repeat frequency is determined by calculating the ratio of the linear disk velocity and the linear bump spacing.

With reference to FIG. 2, the band pass filter 42 is operative for filtering the signal generated by the transducer unit 40 using a passband that is centered at the repeat frequency corresponding to the textured landing zone. The output of the band pass filter 42 is directed to the detector 44 which detects the level of the filtered signal. When the level of the filtered signal exceeds a predetermined threshold level, the detector 44 signals the innermost track location determination unit (ITLDU) 46 that the edge of the textured landing zone has been detected.

The ITLDU 46 continuously monitors the present location of the transducer unit 40 as determined by the STW controller 34. When the ITLDU 46 receives a signal from the detector 44 indicating that the edge of the landing zone has been detected, it immediately records the present location of the transducer unit 40. The ITLDU 46 then calculates the desired location of the innermost track based on this transducer location information. In general, the desired location of the innermost track will be a fixed distance from the detected edge location of the textured landing zone and will depend upon the geometry of the transducer that will be used in the manufactured disk drive.

The ITLDU 46 transfers the desired innermost track location information to the STW controller 34 for use in writing the innermost track. The STW controller 34 then positions the transducer 40 to the indicated location and signals the STW write channel 32 to deliver an appropriate write signal to the transducer unit 40 at an appropriate time. After the innermost track has been written, the STW controller 34 writes each of the remaining tracks using a previous track location as a reference, in a well known manner. In a preferred embodiment, a predetermined number of tracks is written to each of the disks formatted by the STW unit 30.

As described previously, most modem hard drives utilize multiple disks arranged in a vertical stack configuration. Typically, the entire stack used in a particular disk drive is formatted simultaneously within a servo track writer. The disk stack is mounted within the servo track writer with an individual transducer unit 40 located proximate to each disk surface. The servo track writer then generates tracks on all of the disk surfaces simultaneously. In this manner, a plurality of vertically aligned "cylinders" is generated within the disk stack. These cylinders facilitate the performance of sequential read and write operations by allowing sequential data to be written from disk surface to disk surface, rather than from track to track.

In accordance with one aspect of the present invention, a worst-case textured landing zone edge location is determined for an entire disk stack. This worst-case location is then used as the reference for writing servo information to all of the disk surfaces within the stack. In one approach, the above described process of moving the transducer unit 40 in a radial direction while monitoring the resulting transducer signal is performed for all of the disk surfaces in the disk stack simultaneously. The read signals from the respective transducer units are filtered as described above and the detector 44 detects when the magnitude of at least one of the filtered signals exceeds the predetermined threshold. When such a detection is made, the desired location of the innermost track is determined in substantially the same manner as described above for a single disk surface embodiment. The STW controller 34 then writes the innermost track on all of the disk surfaces within the disk stack simultaneously at the desired location. In an alternative approach, a separate landing zone edge location is determined for each disk surface in the disk stack. The worst-case edge location is then selected from the resulting values.

The outer edge location of the textured landing zone can be ascertained in a number of different ways and the invention is not limited to the particular approach described above. In addition, a number of different transducer types can be used to detect the edge of the landing zone in accordance with the present invention. In one approach, the same transducer that is used to write the servo information to the disk 50 is used to detect the landing zone edge. In another approach, two different transducers are provided (e.g., the transducer unit 40 of FIG. 1 can include multiple different transducer elements).

In one embodiment of the invention, a transducer that is capable of sensing changes in gap height between the transducer and the surface of the disk is used to detect the edge of the landing zone. For example, a magneto-resistive (MR) head or a giant magneto-resistive (GMR) head can be used to perform this function. The changes in gap height that occur when such a transducer encounters the textured landing zone will modulate the signal generated by the transducer at a frequency that is related to the specific texturing pattern used. This signal can then be filtered and used to detect landing zone edge location as described above.

In another embodiment, a transducer that is sensitive to mechanical vibrations is used to detect the edge of the landing zone. For example, a piezoelectric element can be included within the transducer unit 40 for generating an electrical signal that is indicative of the present vibrations being experienced by the transducer unit 40. Such an element is typically included in transducers using micro actuator technology. Transducers of this type typically require physical contact between the transducer unit 40 and the textured landing zone to detect the edge location thereof. In many STW devices, the transducer flying height is so low that the bottom edge of the transducer typically rides below the upper extent of the textured landing zone. Thus, contact between the transducer and the landing zone is achieved by simply moving the transducer unit 40 over the landing zone.

In yet another embodiment, data is written to the surface of the disk 50 before the edge location operation is performed. Using this approach, virtually any type of disk drive head can be used to detect the edge of the landing zone. For example, typical thin film inductive heads can be implemented. In addition, the same transducer that is used to write the servo information to the surface of the disk 50 can be used to detect the edge location of the landing zone. The data that is written to the surface of the disk 50 for use in locating the edge of the landing zone is preferably a well defined pattern that will generate a relatively constant read signal as the transducer traverses the data zone in a radial direction. The edge of the landing zone is "detected" when the read signal varies from this relatively constant reading.

Figure 3:
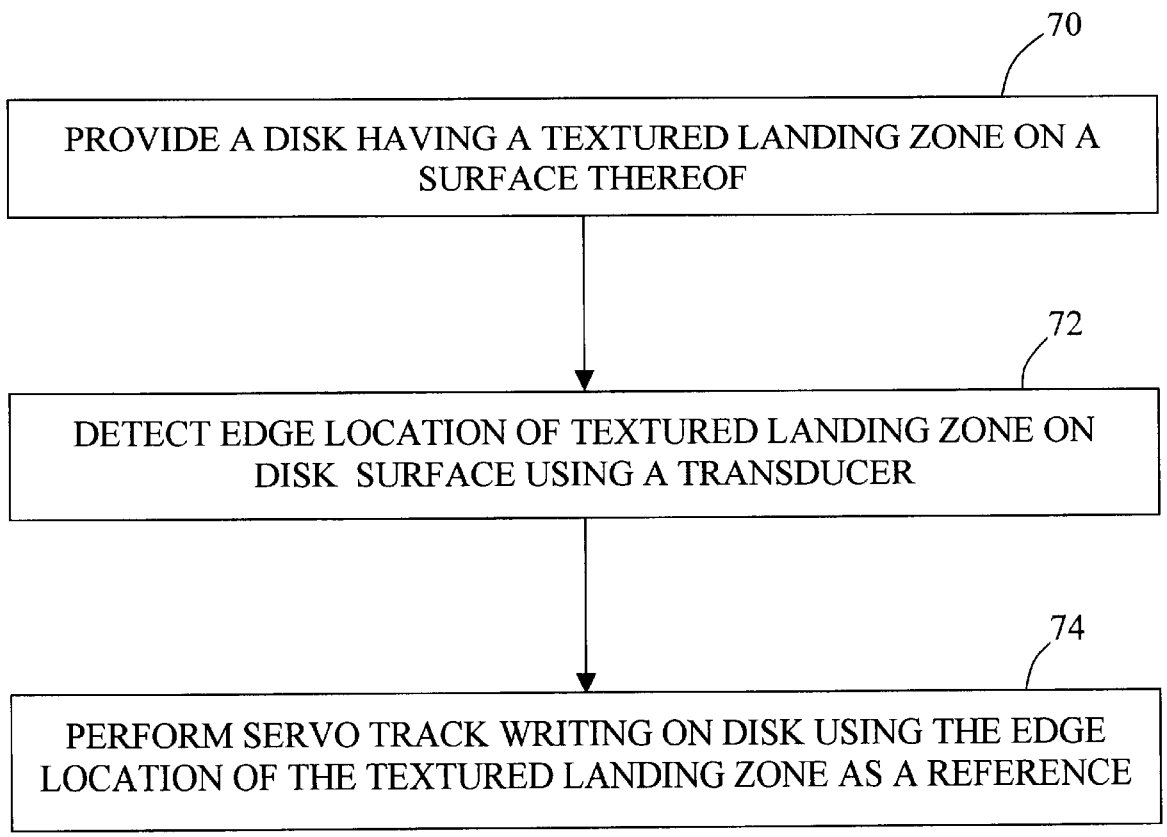
FIG. 3 is a flowchart illustrating a method for formatting a data storage disk with servo information in accordance with one embodiment of the present invention.

FIG. 3 is a flowchart illustrating a method for formatting a data storage disk with servo information in accordance with one embodiment of the present invention. First, a disk having a textured landing zone on a surface thereof is provided for formatting (step 70). The location of the outer edge of the textured landing zone is then determined using a transducer (step 72). Servo tracks are next written to the surface of the disk using the outer edge location of the textured landing zone as a reference (step 74). In a preferred approach, an innermost track of the disk is written a predetermined radial distance from the outer edge location of the textured landing zone. The predetermined distance is determined based upon the geometry of the transducer associated with the disk.

Figure 4:
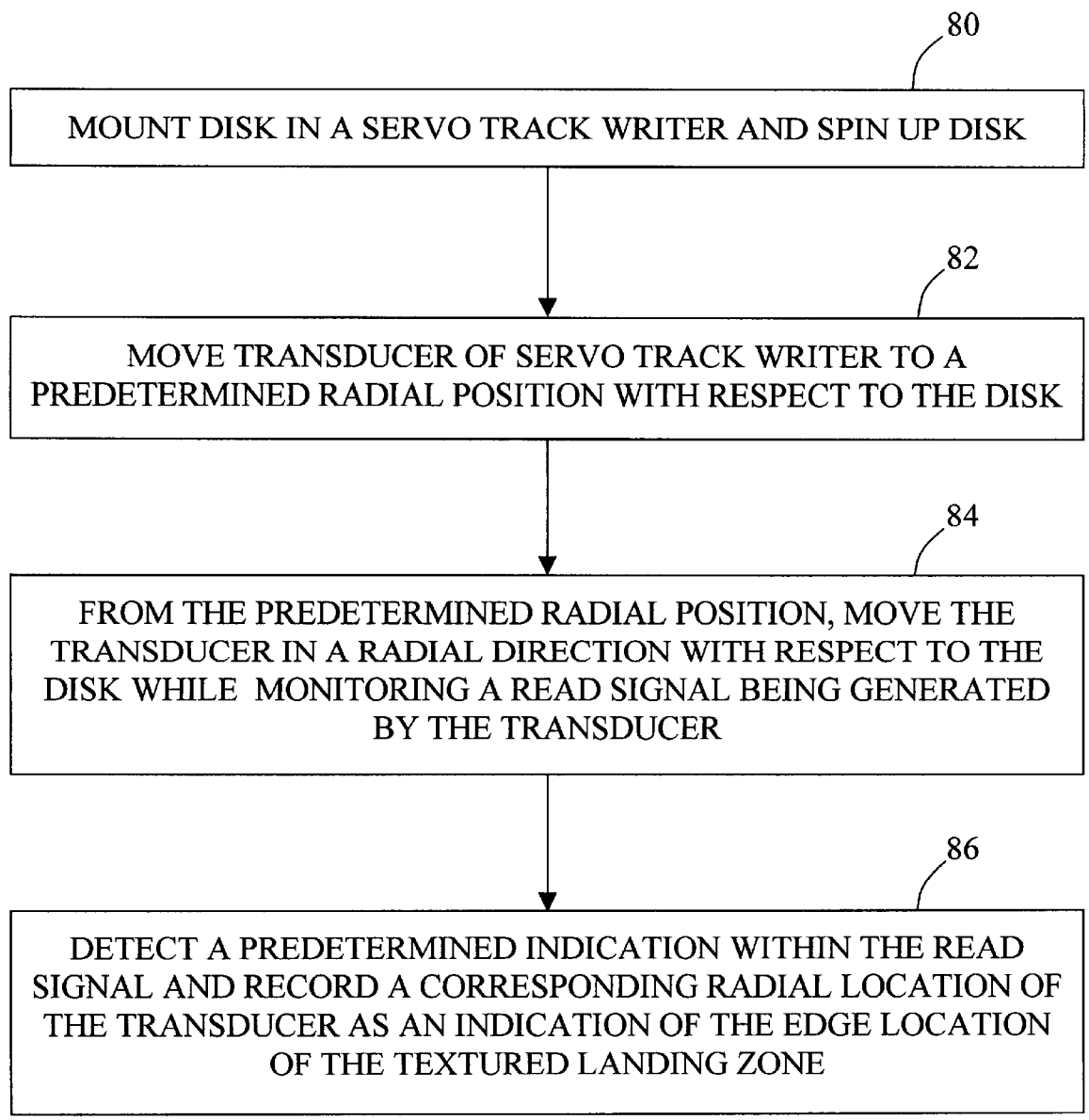
FIG. 4 is a flowchart illustrating a method for detecting the edge location of a textured landing zone on the surface of a data storage disk in accordance with one embodiment of the present invention.

FIG. 4 is a flowchart illustrating a method for detecting the edge location of a textured landing zone on the surface of a data storage disk in accordance with one embodiment of the present invention. The method can be used, for example, to perform step 72 in the method illustrated in FIG. 3. First, the disk is mounted within a servo track writer and is spun up to a predetermined rotational velocity (step 80). A transducer within the servo track writer is then moved to a predetermined radial position with respect to the disk (step 82). From the predetermined radial position, the transducer is next moved in a substantially radial direction (e.g., radially inward) with respect to the disk while a read signal generated by the transducer is monitored (step 84). When a predetermined indication within the read signal is detected, a corresponding radial location of the transducer is recorded as an indication of the edge location of the textured landing zone (step 86). In a preferred approach, the predetermined indication within the read signal consists of a magnitude of the read signal exceeding a predetermined threshold value. Other indications within the read signal are also possible. Instead of performing a sequential search, a binary search strategy can be used which will generally be faster. The radial location of the transducer at the time of the detection of the read signal indication is subsequently used to calculate a desired location for the innermost track of the disk.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in writing servo information on a surface of a data storage disk comprising the steps of:
   providing a disk having a textured landing zone on a first surface thereof, said textured landing zone having a first edge;
   determining a location of said first edge of said textured landing zone on said first surface of said disk; and
   using said location of said first edge as a reference for writing servo information on said first surface of said disk, wherein said step of determining is performed prior to writing servo information on said first surface of said disk.

2. The method, as claimed in claim 1, wherein:
   said step of using said location includes writing a first servo track a predetermined radial distance from said location of said first edge.

3. The method, as claimed in claim 2, wherein:
   said step of using said location includes writing a second servo track a predetermined radial distance from said first servo track.

4. The method, as claimed in claim 1, wherein:
   said step of determining a location includes moving a transducer to a first radial position with respect to said disk and subsequently moving said transducer in a substantially radial direction with respect to said disk from said first radial position while monitoring a signal generated by said transducer.

5. The method, as claimed in claim 4, wherein:
   said step of determining a location includes processing said signal in a bandpass filter to generate a filtered signal.

6. The method, as claimed in claim 5, wherein:
   said bandpass filter has a center frequency that is related to a texturing pattern that exists within said textured landing zone.

7. The method, as claimed in claim 4, wherein:
   said step of determining a location includes detecting a predetermined occurrence within said signal and recording a radial position of said transducer in response thereto.

8. The method, as claimed in claim 7, wherein:
   said step of detecting a predetermined occurrence includes detecting when a magnitude of said signal passes a reference value.

9. The method, as claimed in claim 4, wherein:
   said transducer includes a piezoelectric element that generates an electrical vibration signal indicative of a physical vibration of said piezoelectric element.

10. The method, as claimed in claim 4, wherein:
    said transducer includes a magnetic field sensor that is sensitive to changes in a gap between the magnetic field sensor and said first surface of said disk.

11. The method, as claimed in claim 10, wherein:
    said transducer includes a magneto-resistive (MR) read element.

12. The method, as claimed in claim 4, wherein:
    said step of determining a location includes writing information to said first surface of said disk before said step of moving a transducer.

13. The method, as claimed in claim 1, wherein:
    said step of determining a location is performed using a servo track writer.

14. The method, as claimed in claim 1, wherein:
    said textured landing zone is located at an inner diameter of said first surface of said disk and said first edge is an outer edge of said textured landing zone.

15. The method, as claimed in claim 1, wherein:
    said textured landing zone is located at an outer diameter of said first surface of said disk and said first edge is an inner edge of said textured landing zone.

16. A method for use in writing servo information on a data storage disk, comprising the steps of:
    providing a disk having a textured landing zone on a first surface thereof;
    mounting said disk in a servo track writer (STW) so that a first transducer is adjacent to said first surface;
    determining a location of an edge of said textured landing zone using said first transducer of said STW; and
    writing a first servo track on said first surface of said disk a predetermined distance from said edge of said textured landing zone using a second transducer.

17. The method, as claimed in claim 16, wherein:
    said first transducer includes a piezoelectric element.

18. The method, as claimed in claim 16, wherein:
    said first transducer includes a magneto-resistive read head.

19. The method, as claimed in claim 16, wherein:
    said first transducer includes an inductive head.

20. The method, as claimed in claim 16, wherein:
    said predetermined distance is a value that is stored within said STW.

21. An apparatus for use in writing servo information on a surface of a data storage disk, said surface having a textured landing zone, said apparatus comprising:
    means for determining a location of an edge of said textured landing zone on said surface of said data storage disk;
    means for writing a first servo track on said surface of said data storage disk using said location of said edge of said textured landing zone as a reference, wherein said means for writing writes said first servo track a predetermined radial distance from said location of said edge; and a memory for storing a value for said predetermined radial distance used in writing said first servo track.

22. The apparatus, as claimed in claim 21, wherein:

said means for determining a location includes means for moving a transducer in a radial direction with respect to said disk while monitoring a signal generated by said transducer.

23. The apparatus, as claimed in claim 22, wherein:

said means for determining a location includes means for detecting a predetermined occurrence within said signal and means for recording an indication of transducer position in response thereto.

24. The apparatus, as claimed in claim 21, further comprising:

means for mounting a plurality of data storage disks in a coaxial stack arrangement, wherein said means for determining a location determines a worst case edge location for said plurality of data storage disks.

25. The apparatus, as claimed in claim 24, wherein:

said means for writing a first servo track writes a first servo track for multiple disks within said plurality of data storage disks using said worst case edge location as a reference.

26. A method for use in writing servo information on disk drive storage media comprising the steps of:

providing a plurality of disks arranged in a substantially coaxial disk stack, each of said plurality of disks having a textured landing zone on at least one surface thereof, each textured landing zone having a first edge;

determining a worst case first edge location for said plurality of disks, said worst case first edge location being either an innermost first edge location or an outermost first edge location; and using said worst case first edge location as a reference for writing servo information on said plurality of disks.

27. The method, as claimed in claim 26, wherein:

said step of using includes simultaneously writing a first servo track to each of said plurality of disks using said worst case first edge location as a reference.

28. The method, as claimed in claim 26, wherein:

said step of using includes simultaneously writing a first servo track to each of said plurality of disks a predetermined radial distance from said worst case first edge location.

29. The method, as claimed in claim 26, wherein:

each textured landing zone is located at an inner diameter of a corresponding disk surface;

said first edge of each textured landing zone is an outer edge of said textured landing zone; and said worst case first edge location is an outermost first edge location for said plurality of disks.

30. The method, as claimed in claim 26, wherein:

each textured landing zone is located at an outer diameter of a corresponding disk surface;

said first edge of each textured landing zone is an inner edge of said textured landing zone; and said worst case first edge location is an innermost first edge location for said plurality of disks.

31. A method for use in writing servo information on a surface of a data storage disk comprising the steps of:

providing a disk having a textured landing zone on a first surface thereof, said textured landing zone having a first edge;

determining a location of said first edge of said textured landing zone on said first surface of said disk;

using said location of said first edge as a reference for writing servo information on said first surface of said disk, wherein said step of determining a location includes moving a transducer to a first radial position with respect to said disk and subsequently moving said transducer in a substantially radial direction with respect to said disk from said first radial position while monitoring a signal generated by said transducer, and wherein said step of determining a location includes processing said signal in a bandpass filter to generate a filtered signal.

32. The method, as claimed in claim 31, wherein:

said step of using said location includes writing a first servo track a predetermined radial distance from said location of said first edge.

33. The method, as claimed in claim 32, wherein:

said step of using said location includes writing a second servo track a predetermined radial distance from said first servo track.

34. The method, as claimed in claim 33, wherein:

said bandpass filter has a center frequency that is related to a texturing pattern that exists within said textured landing zone.

35. A method for use in writing servo information on a surface of a data storage disk comprising the steps of:

providing a disk having a textured landing zone on a first surface thereof, said textured landing zone having a first edge;

determining a location of said first edge of said textured landing zone on said first surface of said disk;

using said location of said first edge as a reference for writing servo information on said first surface of said disk, wherein said step of determining a location includes moving a transducer to a first radial position with respect to said disk and subsequently moving said transducer in a substantially radial direction with respect to said disk from said first radial position while monitoring a signal generated by said transducer, and wherein said step of determining a location includes detecting a predetermined occurrence within said signal and recording a radial position of said transducer in response thereto.

36. The method, as claimed in claim 35, wherein:

said step of detecting a predetermined occurrence includes detecting when a magnitude of said signal passes a reference value.

37. A method for use in writing servo information on a surface of a data storage disk comprising the steps of:

providing a disk having a textured landing zone on a first surface thereof, said textured landing zone having a first edge;

determining a location of said first edge of said textured landing zone on said first surface of said disk;

using said location of said first edge as a reference for writing servo information on said first surface of said disk, wherein said step of determining a location includes moving a transducer to a first radial position with respect to said disk and subsequently moving said transducer in a substantially radial direction with respect to said disk from said first radial position while monitoring a signal generated by said transducer, and wherein said transducer includes a piezoelectric element that generates an electrical vibration signal indicative of a physical vibration of said piezoelectric element.

38. A method for use in writing servo information on a surface of a data storage disk comprising the steps of:

providing a disk having a textured landing zone on a first surface thereof, wherein said textured landing zone has a first edge, wherein said textured landing zone is located at an outer diameter of said first surface of said disk and wherein said first edge is an inner edge of said textured landing zone;

determining a location of said first edge of said textured landing zone on said first surface of said disk; and using said location of said first edge as a reference for writing servo information on said first surface of said disk.

39. A method for use in writing servo information on a surface of a data storage disk comprising the steps of:

providing a disk having a textured landing zone on a first surface thereof, said textured landing zone having a first edge;

determining a location of said first edge of said textured landing zone on said first surface of said disk;

using said location of said first edge as a reference for writing servo information on said first surface of said disk, wherein said step of determining a location includes moving a transducer to a first radial position with respect to said disk and subsequently moving said transducer in a substantially radial direction with respect to said disk from said first radial position while monitoring a signal generated by said transducer, and wherein said first transducer includes a piezoelectric element.

40. A method for use in writing servo information on a data storage disk, comprising the steps of:

providing a disk having a textured landing zone on a first surface thereof;

mounting said disk in a servo track writer (STW) so that a first transducer is adjacent to said first surface, said first transducer including a piezoelectric element;

determining a location of an edge of said textured landing zone using said piezoelectric element of said first transducer; and writing a first servo track on said first surface of said disk a predetermined distance from said edge of said textured landing zone.

41. An apparatus for use in writing servo information on a surface of a data storage disk, said surface having a textured landing zone, said apparatus comprising:

means for determining a location of an edge of said textured landing zone on said surface of said data storage disk;

means for writing a first servo track on said surface of said data storage disk using said location of said edge of said textured landing zone as a reference, wherein said means for determining a location includes means for moving a transducer in a radial direction with respect to said disk while monitoring a signal generated by said transducer, and wherein said means for determining a location includes means for detecting a predetermined occurrence within said signal and means for recording an indication of transducer position in response thereto.

42. An apparatus for use in writing servo information on a surface of a data storage disk, said surface having a textured landing zone, said apparatus comprising:

means for determining a location of an edge of said textured landing zone on said surface of said data storage disk;

means for writing a first servo track on said surface of said data storage disk using said location of said edge of said textured landing zone as a reference; and means for mounting a plurality of data storage disks in a coaxial stack arrangement, wherein said means for determining a location determines a worst case edge location for said plurality of data storage disks.

43. The apparatus, as claimed in claim 42, wherein:

said means for writing a first servo track writes a first servo track for multiple disks within said plurality of data storage disks using said worst case edge location as a reference.

44. A method for use in writing servo information on a surface of a data storage disk comprising the steps of:

providing a disk having a textured landing zone on a first surface thereof, said textured landing zone having a first edge;

determining a location of said first edge of said textured landing zone on said first surface of said disk; and using said location of said first edge as a reference for writing servo information on said first surface of said disk, wherein said servo information is written from said first edge towards an outer diameter of said first surface when said landing zone is located at an inner diameter of the first surface.

45. A method for use in writing servo information on a surface of a data storage disk comprising the steps of:

providing a disk having a textured landing zone on a first surface thereof, said textured landing zone having a first edge;

determining a location of said first edge of said textured landing zone on said first surface of said disk; and using said location of said first edge as a reference for writing servo information on said first surface of said disk, wherein said servo information is written from said first edge towards an inner diameter of said first surface when said landing zone is located at an outer diameter of the first surface.

* * * * *